United States Patent [19]
Slavik

[11] 3,740,611
[45] June 19, 1973

[54] VERTICAL DEFLECTION WAVEFORM GENERATOR

[75] Inventor: William H. Slavik, Palos Hill, Ill.
[73] Assignee: Motorola, Inc., Franklin Park, Ill.

[22] Filed: July 28, 1971
[21] Appl. No.: 166,837

[52] U.S. Cl. .......... 315/27 GD
[51] Int. Cl. .......... H01j 29/70
[58] Field of Search .......... 315/27 GD, 27 TD, 315/27 R, 26

[56] References Cited
UNITED STATES PATENTS

| | | | |
|---|---|---|---|
| 3,614,411 | 10/1971 | Henderson | 315/18 |
| 3,646,393 | 2/1972 | Tarr | 315/27 TD |

*Primary Examiner*—Carl D. Quarforth
*Assistant Examiner*—J. M. Potenza
*Attorney*—Mueller & Aichele

[57] ABSTRACT

A waveform generator for supplying driving current to the vertical deflection coils of a television receiver includes a source of linear sawtooth signals which are applied in phase opposition to a first product multiplier to produce a parabolic waveform. This waveform is applied to one of two inputs of a second product multiplier, the other input of which is supplied with the sawtooth signals to produce at the output of the second product multiplier a third order waveform used to supply driving current to the vertical deflection coils of the television receiver.

6 Claims, 2 Drawing Figures

Patented June 19, 1973 3,740,611

Inventor
WILLIAM H. SLAVIK
BY
Mueller & Aichele
ATTYS.

VERTICAL DEFLECTION WAVEFORM GENERATOR

BACKGROUND OF THE INVENTION

In cathode ray tubes commonly employed in television receivers the radius of curvature of the cathode ray tube screen generally is greater than the distance from the screen to the center of deflection of the vertical deflection coils. Because of this difference, if a linear sawtooth waveform is applied as a driving current to the vertical deflection coils, distortion of the reproduced image results in the form of what is commonly referred to as a tangent error. To obviate this distortion, the deflecting current in modified to an S-shape by altering the shape of the curve produced by the sawtooth generator. Generally this S-correction is obtained with a positive feedback circuit. This results in instability in the overall system of which such a circuit is a part; and with feedback from the yoke to the sawtooth oscillator for sustaining oscillation, horizontal information gets fed back to the vertical oscillator which results in poor interlace in the system between the vertical and horizontal scan.

SUMMARY OF THE INVENTION

Therefore, it is an object of this invention to provide an improved vertical deflection system for a television receiver.

It is another object of this invention to provide an S-correction circuit for the vertical deflection system of a television receiver without the use of positive feedback.

It is a further object of this invention to employ a pair of product detectors in the vertical deflection system of a television receiver for producing an S-configuration for the driving current applied to the vertical deflection coils.

In accordance with a preferred embodiment of this invention, a circuit for producing vertical deflection current for driving the vertical deflection coils of a cathode ray tube provides an S-corrected driving current by applying sawtooth signals to the two inputs of a first product multiplier to produce a parabolic waveform at the output thereof. This parabolic waveform is applied to one of two inputs of a second product multiplier, the other input of which is supplied with the sawtooth waveform signal. The output of the second product multiplier then essentially is a third order signal in the form of the desired "S" corrected output waveform. This signal is applied to the vertical deflection coils as the driving current.

In a more specific embodiment, an operational amplifier circuit is supplied with the S-corrected waveform from the second product multiplier on one of two inputs, with the output current through the vertical deflection coils being fed back in a negative feedback circuit to the other input thereof. The operational amplifier causes a comparison of the signals on the two inputs to provide excellent linearity of the circuit operation.

DETAILED DESCRIPTION

Figure 1:
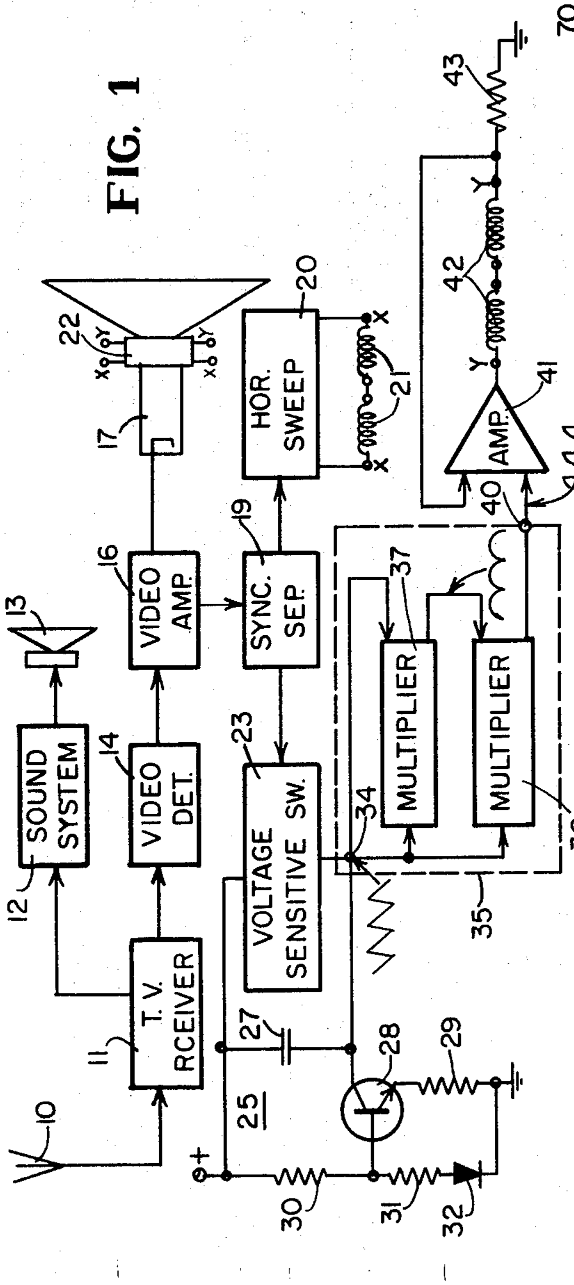
FIG. 1 is a block diagram of a television system employing a preferred embodiment of this invention.

Referring now to FIG. 1, there is shown a block diagram of a television receiver including an antenna 10 for receiving a composite television signal, which includes luminance or brightness signal components, synchronizing signal components, and if the television signal is a color signal, chrominance signal components and burst signal components. This received composite signal is applied to a receiver stage 11, which may be of a conventional type and includes the RF and IF amplifier stages of the receiver. One output of the receiver stage 11 is applied to a sound system 12, which supplies amplified audio output signals to a loudspeaker 13.

The video signal components of the signal processed by the receiver stage 11 are applied to a video detector 14 which supplies the detected video signals to a video amplifier circuit 16. This latter circuit drives the cathode of a cathode ray tube 17 for reproducing the images represented by the received signals. An output of the video amplifier circuit 16 also is applied to a synchronizing signal separator circuit 19, which separates the vertical and horizontal synchronizing signal components from the composite signal. The horizontal synchronizing signal components are applied to a horizontal sweep circuit 20 which provides the horizontal deflection current to horizontal deflection coils 21 on a yoke 22 mounted on the neck of the cathode ray tube 17.

The vertical synchronizing signal components are applied to a voltage sensitive switch 23 to synchronize the operation of the switch 23 with the vertical synchronizing signal components to thereby synchronize the operation of the vertical sweep system of the receiver. The switch 23 is part of a sawtooth oscillator circuit 25 operating as a relaxation oscillator. A timing capacitor 27 constitutes the timing element of the oscillator and is charged from a source of positive potential (not shown) through a constant current source NPN transistor 28, the emitter of which is connected to ground through an emitter resistor 29 and the collector of which is connected to one terminal of the capacitor 27. A voltage divider, including a pair of resistors 30 and 31 connected in series with a diode 32 between the positive supply terminal and ground, provides the operating bias for the base of the transistor 28 which is connected to the junction between the resistors 30 and 31.

Assume initially that the capacitor 27 has been fully discharged by operation of the voltage sensitive switch 23 effectively coupling the positive potential source to the junction of the capacitor 27 with the collector of the transistor 28. When this has occurred, the potential on the collector of the transistor 28 is near the full value of the positive potential of the source. As the transistor 28 conducts current through the capacitor 27, the potential on the collector of the transistor 28 falls toward ground on a linear ramp at an input terminal 34 coupled to an S waveform correction circuit 35, indicated in FIG. 1 as enclosed within the dotted lines. When the potential on the collector of the transistor 28 reaches a predetermined value established by the threshold of the voltage sensitive switch 23, the switch 23 once again is rendered conductive to return the charge on the capacitor 27 at the collector of the transistor 28 to near the value of the positive potential source and the cycle is repeated.

The sawtooth signals present on the terminal 34 are applied to the two inputs of a first product multiplier 37, which produces on its output a parabolic waveform as indicated within the dotted lines in FIG. 1. This parabolic waveform is applied to one of the two inputs of a second product multiplier 38, the other input of which is supplied with the sawtooth waveform present on the terminal 34. The operation of the product multiplier 38 is such that it produces on its output the desired S-corrected sawtooth signal on an output terminal 40 as shown in FIG. 1.

The corrected signal is applied to one of the two inputs of an operational amplifier circuit 41 which supplies the desired deflection current through the vertical deflection coils 42, located on the deflection yoke 22, and a resistor 43 to ground. The junction between the resistor 43 and the coils 42 is employed as a negative feedback point and is connected to the other input of the operational amplifier 41 which compares signals on its two inputs and corrects for nonlinearities in the actual current waveform passing through the deflection coils 42. Whether the S-corrected signal on the output terminal 40 of the correction circuit 35 is applied to the inverting or noninverting input of the amplifier circuit 41 is dependent upon the phase of the signal relative to the desired current passing through the deflection coils 42. Of course, the feedback to the other input of the operational amplifier 41 also would be either to the inverting or noninverting input as determined by which of the inputs was connected to the terminal 40.

Figure 2:
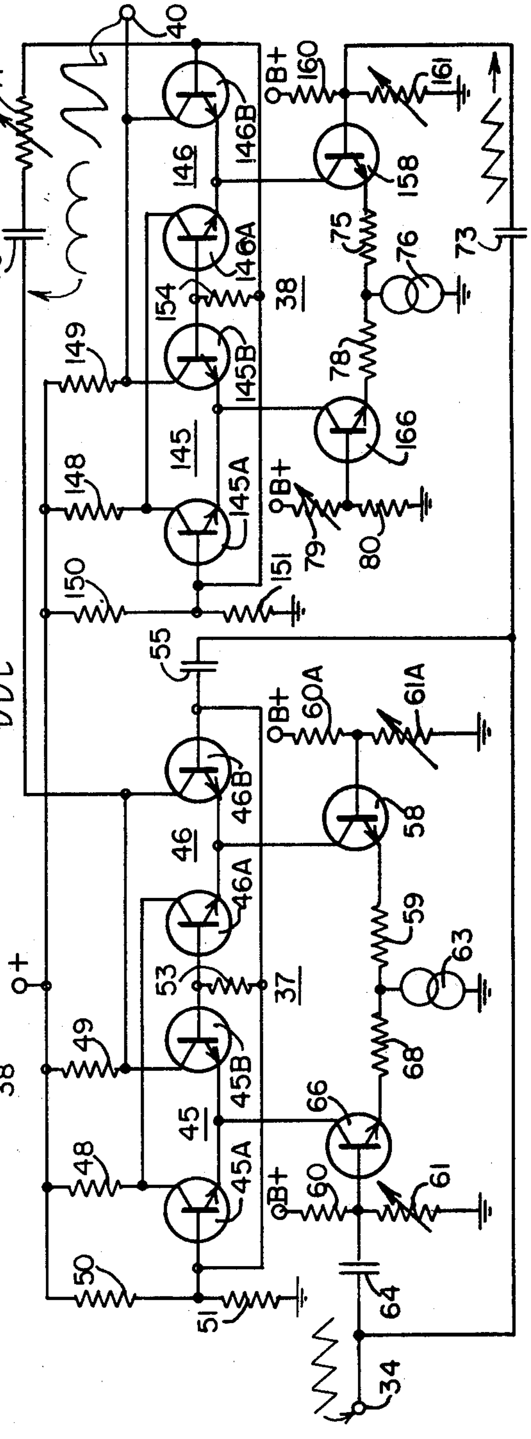
FIG. 2 is a detailed schematic diagram of a portion of the circuit shown in FIG. 1.

In FIG. 2 there is shown a detailed schematic diagram of the portion of the circuit enclosed in the dotted lines 35 of FIG. 1. The input terminal 34, on which the sawtooth signal waveform from the oscillator circuit 35 appears, is provided with the same reference number in FIG. 2 as is the output terminal 40 on which the desired S-corrected sawtooth waveform appears. The first product demodulator 37 includes a pair of differential switches or switching amplifiers 45 and 46 each including a pair of NPN transistors 45A, 45B and 46A, 46B, respectively. The collectors of corresponding transistors in each of the differential switches 45 and 46 are cross-connected and are supplied with operating potential from a suitable source of B+ (not shown) through collector load resistors 48 and 49. An operating bias for the bases of the transistors in the differential switches 45 and 46 is obtained from a voltage divider, including resistors 50 and 51 connected between the source of B+ and ground. The junction of the resistors 50 and 51 is connected directly to the bases of the transistors 45A and 46B and is connected through a resistor 53 to the bases of the transistors 45B and 46A.

Input signals on the terminal 34 are applied through a coupling capacitor 55 to the bases of the transistors 45A and 46B and through another coupling capacitor 64 to the base of an NPN input transistor 66, the collector of which is connected to the emitters of the transistors in the differential switch 45, and the emitter of which is connected through an emitter load resistor 68 to a current source 63. An operating bias potential for the base of the transistor 66 is obtained from a voltage divider comprising a pair of resistors 60 and 61 connected between the source of B+ and ground.

The collector of another NPN input transistor 58 is connected to the emitters of the transistors in the differential switch 46, and its emitter is connected through a suitable emitter load resistor 68 to the current source 63. Operating bias potential for the base of the transistor 58 is obtained from a voltage divider 60A, 61A connected between B+ and ground.

Thus, it is apparent that the signals applied to the emitters of the transistors in the two differential switches 45 and 46 are the same but are of opposite phase. The switching of the switches 45 and 46 is controlled at the same signal rate by the sawtooth signals applied through the coupling capacitor 55 to the bases of the transistors 45A and 46B; and by cross-coupling the collectors of the corresponding transistors in each of the differential switches 45 and 46, parabolic output signals of opposite phases are obtained from each set of cross-coupled collectors. The signal present on the collectors of the transistors 45B and 46B is indicated as of positive phase. For the purposes of operation of the circuit shown in FIG. 2, the positive phase output is desired but it is apparent that the negative phase signal could be utilized as well since it has the same characteristics as the signal present on the cross-coupled collectors of the transistors 45B and 46B.

This parabolic output signal of the product multiplier circuit 37 is applied through a coupling capacitor 70 and a variable resistor 71, which controls the attenuation of the parabolic output signal, to the bases of a pair of NPN transistors 145A and 146B located respectively in differential switches or switching amplifiers 145 and 146 in the product multiplier 38. Each of the circuits 145 and 146 includes a second NPN transistor 145B and 146A, respectively, and the collectors of corresponding transistors in the differential switches 145 and 146 are cross-coupled and connected through collector load resistors 148 and 149 to the source of B+ potential. An operating bias potential for the bases of the transistors 145A and 146B in the differential switches 145 and 146 is obtained from a voltage divider including a pair of resistors 150 and 151 connected between B+ and ground.

The second input signal for the product demodulator 38 constitutes the sawtooth waveform signal on the terminal 34 which is connected through a coupling capacitor 73 to the base of a first input transistor 158, the collector of which is connected to the emitters of the switching transistors 146A and 146B, and the emitter of which is connected to a current source 76 through a resistor 75. The DC biasing potential for the transistor 158 is provided by a voltage divider 160, 161 connected between B+ and ground, and the operation of the input transistor 158 in conjunction with the differential switch 146 is comparable to the operation of the input transistor 66 for the differential switch 45.

The product multiplier 38 is similar to the product multiplier 37 with operation of the differential switch 145 being comparable to the differential switch 46. An NPN input transistor 166 is supplied with a DC reference potential obtained from a voltage divider including a pair of resistors 79 and 80 connected between B+ and ground. The collector of the transistor 166 is connected to the emitters of the transistors 145A and 145B and the emitter of the transistor 166 is connected through a resistor 78 to the current source 76. Because of the cross-coupling which is made between the comparable transistors of each of the differential switches 145 and 146, and because comparable transistors in the switches 145 and 146 are switched out-of-phase with one another, the resultant signal appearing on the cross-coupled collectors of the transistors 145B and 146B connected to the output terminal 40, is an S-curve corrected sawtooth waveform as shown in FIG. 2.

Since no positive feedback is necessary to provide this S-corrected output signal, the inherent instability which is present in circuits employing positive feedback has been eliminated. Since there is no feedback from the vertical deflection yoke to the oscillator circuit portion of the vertical deflection current generating system, the problem of undesirable horizontal information being fed back to the vertical oscillator also has been eliminated by the use of the circuit shown in FIGS. 1 and 2.

By varying the amplitude of the parabolic signals applied to the bases of the transistors 145A and 146B, the amount or shape of the S configuration of the sawtooth waveform appearing on the output terminal 40 may be adjusted. This is the reason for showing the potentiometer 71 in the series circuit between the output of the product multiplier 37 and the parabolic input of the product multiplier 38. If a fixed amount of parabolic correction can be predetermined, the value of the resistor 71 may be fixed.

I claim:

1. A circuit for producing vertical deflection current for driving the vertical deflection coils of a cathode ray tube in which the radius of curvature of the screen is greater than the distance between the screen and the deflection center, said circuit including in combination:

a source of sawtooth signals at the desired frequency of operation of said vertical deflection coil;

first and second product multipliers each comprising first and second differential switching circuits, each differential switching circuit having first and second transistors with collector, base and emitter electrodes, the emitters of the first and second transistors of each of the differential switching circuits being interconnected, the bases of the first transistor of said first differential switching circuit and the second transistor of said second differential switching circuit in each of said product multipliers being interconnected, the bases of the second transistor of said first differential switching circuit and the first transistor of said second differential switching circuit in each of said product multipliers being interconnected, the collectors of the first transistors of each of said differential switching circuits in each of said product multipliers being interconnected, and the collectors of each of the second transistors in each of said differential switching circuits in each of said product multipliers being interconnected;

first and second input transistors in each of said product multipliers, each of said input transistors having collector, base and emitter electrodes, with the collector-emitter paths thereof being coupled respectively in common with the emitters of the transistors in said differential switching circuits;

first circuit means coupling said source of sawtooth signals with the bases of at least one of the input transistors of each of said first and second product multipliers;

second circuit means coupling said source of sawtooth signals with the bases of the first transistor of said first differential switching circuit and the second transistor of said second differential switching circuit of said first product multiplier;

third circuit means coupling the collectors of the second transistors of said differential switching circuits of said first product multiplier with the base of the first transistor of said first differential switching circuit in said second product multiplier and the base of the second transistor of said second differential switching circuit in said second product multiplier; and fourth circuit means coupling the output of said second product multiplier, obtained from the interconnected collectors of the transistors in said first and second differential switching circuits of said second product multiplier, with said vertical deflection coils for supplying deflection current thereto.

2. The combination according to claim 1 wherein said third circuit means includes variable resistance means coupled in series between the output of said first product multiplier and the second input of said second product multiplier.

3. The combination according to claim 1 wherein said source of sawtooth signals includes a charge storage timing capacitor connected in series with a constant current source for charging said capacitor from a first predetermined value toward a second predetermined value at a predetermined rate and a voltage sensitive switch coupled across said capacitor and responsive to a predetermined charge attained thereby for returning the charge on said capacitor to said first predetermined value, said first circuit means being coupled between said capacitor and the first inputs of said first and second product multipliers.

4. The combination according to claim 1 wherein said fourth circuit means includes an operational amplifier having first and second inputs, with the output of said second product multiplier being coupled with the first input of said operational amplifier, and feedback circuit means coupled with said deflection coils and said second input of said operational amplifier, with said operational amplifier comparing the signals on said first and second inputs and correcting for nonlinearities.

5. The combination according to claim 4 wherein one of said first and second inputs of said operational amplifier is an inverting input and the other of said inputs is a noninverting input.

6. The combination according to claim 1 wherein said first circuit means couples said source of sawtooth signals with the bases of said first input transistors of said first and second product multipliers, the bases of said second input transistors of said first and second product multipliers being coupled with a source of reference potential.

* * * * *